Patented Nov. 4, 1930

1,780,643

UNITED STATES PATENT OFFICE

PHILIP S. DANNER, OF POINT RICHMOND, AND JOHN E. MUTH, OF BERKELEY, CALIFORNIA, ASSIGNORS TO STANDARD OIL COMPANY OF CALIFORNIA, OF SAN FRANCISCO, CALIFORNIA, A CORPORATION OF DELAWARE

METAL AMINO CARBONYLS AND PROCESS OF MAKING THE SAME

No Drawing. Application filed September 26, 1927. Serial No. 222,198.

This invention relates to a new product, a metal amino carbonyl, and to a process of producing the same.

The existence of a chemical compound formed by the direct combination of metallic iron and gaseous carbon monoxide has been known for many years, but the difficulties involved in preparing this substance in material quantities have prevented any considerable accumulation of knowledge concerning its chemical and physical properties. The iron carbonyl compound most commonly known is the pentacarbonyl, $Fe(CO)_5$. This compound is prepared in a well known manner by passing the carbon monoxide gas over highly activated iron under pressure at temperatures of from approximately 350° to 400° F. The iron pentacarbonyl thus produced is unstable in the presence of light, yielding a compound known as iron enneacarbonyl, $Fe_2(CO)_9$. This latter carbonyl is stable, no further action taking place.

The ready decomposition and polymerization of the pentacarbonyl lead to the belief that there was present a point of high reactivity in the molecular structure of the pentacarbonyl and suggested the possibility of reaction in combination with other molecules. Proceeding upon this theory, it has been discovered that a reaction and combination can be made to take place with the group of ammonia bases including ammonia and substituted ammonias known as amines. For example, when iron pentacarbonyl is treated under proper conditions of temperature and pressure, as explained hereinafter, with ammonia or an amine there is formed a new chemical compound which is properly denominated an iron amino pentacarbonyl.

The physical and chemical properties of these new compounds and the conditions under which they are formed will, of course, vary depending upon which of the ammonia compounds is used. In general, the iron amino carbonyls are rather volatile liquids of a deep red color. They are also stable to light, water, air and moderate temperatures (i. e., temperatures below approximately 300° F.) but are decomposed by the strong acids. The iron amino carbonyls are formed in general by the action of ammonia or an amine upon iron pentacarbonyl in a closed system under the vapor pressures of the reactants at the temperature of the reaction, the temperature of the reaction generally being from 150° to 250° F.

The present invention will be more fully understood, together with various additional objects and advantages thereof, by a description of a preferred form or example of a product embodying the invention and of the process of producing the same. For this purpose, there is hereinafter described the preferred form of product and process of producing the same.

In the preferred process, the iron pentacarbonyl and diethyl amine in substantially equal molecular proportions are placed in a suitable vessel capable of withstanding a pressure up to 10 atmospheres and heated to a temperature of approximately 210° F. by a suitable means, for example, a steam jacket. Under these conditions, a reaction proceeds which is accompanied by a change of color of the liquid and a change of pressure on the system. The color of the admixture at the start of the reaction is light amber but it changes slowly to a deep crimson as the reaction proceeds. The initial pressure is preferably about 3 atmospheres at the start of the reaction and gradually falls until it is slightly more than atmospheric when the reaction is complete. The reaction proceeds in the production of the new compound, iron diethyl amino pentacarbonyl. If a slight excess of the amine is used, the formation of iron diethyl amino pentacarbonyl from the iron pentacarbonyl and diethyl amine is substantially complete and equal to the theoretical in about 2 to 8 hours. The speed of the reaction can be increased by the use of higher temperatures but with a loss of yield.

The iron diethyl amino pentacarbonyl thus prepared has a number of valuable properties, among which is its value as a supressor of detonation when mixed with gasoline and used in an internal combustion engine. The probable formula of said iron diethyl amino pentacarbonyl is $Fe(CO)_5 \cdot NH(C_2H_5)_2$. The iron diethyl amino pentacarbonyl has an advantage over the carbonyls previously employed, such as pentacarbonyl, in that it is stable on exposure to light and air. No claim herein is made to the composition including iron diethyl amino pentacarbonyl gasoline, the same being described in a copending application, Serial No. 222,197 filed September 26, 1927.

While the process and product of the present invention has been described particularly with reference to the iron diethyl amino pentacarbonyl and its production from iron pentacarbonyl and diethyl amine, there is a considerable class of substances of equivalent nature to the iron diethyl amino pentacarbonyl which can be produced by the reaction of the present invention. For example, in producing the compound of the present invention and in the process of the present invention other metal carbonyls such as iron tetracarbonyl, iron enneacarbonyl, cobalt tricarbonyl, cobalt tetracarbonyl, nickel tetracarbonyl, molybdenum hexacarbonyl, etc., and other ammonia compounds including ammonia and the aliphatic and aliphatic-aromatic amines, the methyl amines, ethyl amines (monoethyl amine, diethyl amine, triethyl amine) butyl amines, etc., may be employed.

The present invention is not limited to the specific form of product or process described for the purpose of forming a complete disclosure of the invention, but the invention includes all such modifications and changes as come within the scope of the following appended claims.

We claim:

1. An iron amino pentacarbonyl.
2. An iron aliphatic amino pentacarbonyl.
3. An iron ethyl amino pentacarbonyl.
4. An iron diethyl amino pentacarbonyl.
5. A process of producing metal amino carbonyls comprising placing a metal carbonyl and an aliphatic nitrogen base in a closed vessel, and heating the mixture.
6. A process of producing metal amino carbonyls comprising placing a metal carbonyl and an amine in a closed vessel, and heating the mixture.
7. A process of producing metal amino carbonyls comprising placing a metal carbonyl and an amine in a closed vessel, and heating the mixture while maintaining a pressure greater than atmospheric.
8. A process of producing a metal amino carbonyl comprising heating an admixture of iron carbonyl, and an aliphatic nitrogen base to a reaction temperature.
9. A process of producing a metal amino carbonyl which comprises heating a mixture of iron pentacarbonyl and an aliphatic nitrogen base to a reaction temperature.
10. A process of producing a metal amino carbonyl which comprises heating an admixture of a metallic carbonyl and an aliphatic nitrogen base to a reaction temperature.
11. A process of producing a metal amino carbonyl which comprises heating iron carbonyl and an amine in substantially equal molecular proportions to a reaction temperature.
12. A process of producing a metal amino carbonyl which comprises heating a metallic carbonyl and an aliphatic nitrogen base to a temperature of from 150° to 250° F.
13. A process of producing a metallic amino carbonyl which comprises heating an ethyl amine and metallic carbonyl under the vapor pressure of the reactants between the temperatures of 150° F. and 250° F.
14. An amino carbonyl of a single metal free from alkali metals containing not less than three carbonyl groups for every atom of metal in the compound.
15. An iron amino carbonyl free from alkali metals, containing not less than three carbonyl groups for each atom of iron in such compound.

Signed at Richmond, Cal., this 7th day of September, 1927.

PHILIP S. DANNER.
JOHN E. MUTH.